UNITED STATES PATENT OFFICE.

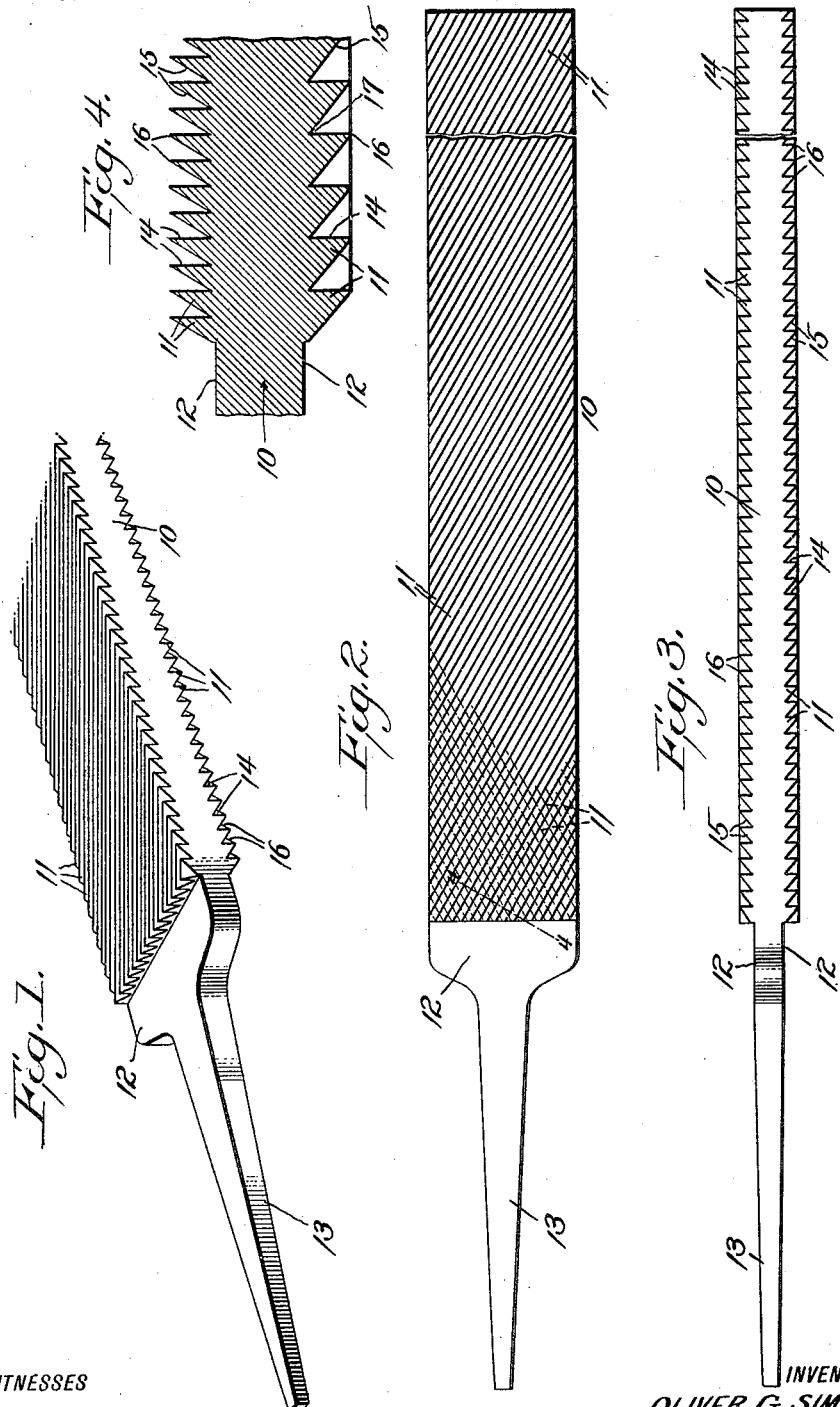

OLIVER GEORGE SIMMONS, OF PHILADELPHIA, PENNSYLVANIA.

FILE.

1,104,561. Specification of Letters Patent. Patented July 21, 1914.

Application filed July 1, 1913. Serial No. 776,781.

*To all whom it may concern:*

Be it known that I, OLIVER GEORGE SIMMONS, a citizen of the United States, and a resident of Philadelphia, in the county of Philadelphia and State of Pennsylvania, have invented a new and Improved File, of which the following is a full, clear, and exact description.

This invention relates to metal working tools and has particular reference to files.

Among the objects of this invention is to produce a file, preferably of the flat face type, adapted especially for the finishing of fine work, the teeth of the file being arranged and formed in a peculiar manner with respect to one another and the body of the file.

More definitely stated, a file made in accordance with this invention has finer and keener cutting qualities than other files now commonly known, and is such that the file as a whole is more effective and durable, but when it becomes dulled it may be resharpened in a simple and economical manner.

The foregoing and other objects of the invention will hereinafter be more fully described and claimed and illustrated in the drawings forming a part of this specification in which like characters of reference indicate corresponding parts in all the views, and in which—

Figure 1 is a perspective view illustrating a fragment of a file made in accordance with this invention; Fig. 2 is a plan view; Fig. 3 is an edge view of the same; and Fig. 4 is a sectional detail on the line 4—4 of Fig. 2.

As herein set forth, the file is made preferably from a blank forming a body 10 having teeth 11 formed on either or both of its surfaces. The teeth on either face of the file constitute a series extending from one end of the file to the other, but at the tang end of the file is formed an offset 12 formed in the blank prior to the formation of the teeth, said offset being substantially equal in depth to the depth of the teeth or perhaps slightly greater so as to leave a plane or clear space between the series of teeth and the tang 13. This obviates what I have discovered to be a source of considerable objection with files as usually made for, when operating on fine finished surfaces, such as this file is best adapted for, there is danger of marring or burring the job by reason of the handle or some other projecting part associated with the tang end of the file striking into the work. The teeth of this file are straight and unbroken throughout their length and parallel with one another in each series. Each tooth extends along the face of the file, forming a sharp angle with the longitudinal axis or edge of the file. I prefer for this formation an angle of about 30 degrees more or less, making the appearance and operation of the file distinct from other files now in common use.

The teeth are all substantially alike in size and form throughout each series, and each tooth in cross section is peculiar with respect to its shape and inclination of its faces. The front or cutting face 14 of each tooth is perfectly flat and constitutes a plane preferably exactly perpendicular to the median plane of the file body. The rear face 15 of each tooth likewise is a perfect plane and intersects the plane or face 14 of the same tooth at the cutting edge 16 of such tooth, forming an angle of substantially 30 degrees. Said face 15 of each tooth also intersects the cutting face 14 of the following tooth at its root 17 in a sharp angle of substantially 30 degrees.

The file teeth may be formed in any suitable manner, preferably by a milling machine of a well known or standard type which is adapted to operate in right lines across one or more file blanks arranged alongside of one another. A file made in this way having milled teeth is sharper, keener and more durable than one which is cut by a punching operation. The metal of which the teeth are formed is left in its natural and perfect condition and not subjected to the upsetting or crystallizing damaging effect due to the making of a punched file. Furthermore, in my experience I have observed that from 25 to 50% of the files in every box of punched files are defective either in part or substantially throughout at least one face because the cutting or punching operation upon the other face causes damage to the face first cut due to the impact of the cutting machine. In the making of milled files, however, the milling cutter operating in a totally different manner does not cause damage to the face of the file upon which teeth have previously been cut.

Teeth made in accordance with this invention are keener and sharper than other files with which I am familiar, because of their extreme depth in proportion to the number of teeth per inch or pitch. The cutting faces of the teeth being perpendicular to the file body are not likely to become clogged when operating upon softer metals as is common with files having undercut or punched teeth. The long slope due to the acute angle between the axis of each tooth and the edge of the file also increases the facility for rendering this file self-cleaning. By making files in the manner herein set forth I am enabled to produce milled files in the most rapid manner and hence can turn out files of this character at economical prices and yet having exceedingly fine teeth. The operation of the teeth in this file is purely shearing operation and because of the peculiar nature of such teeth the file is particularly well adapted for smoothing or finishing work. The file teeth, though cut very deep in proportion to their gage, do not weaken the file sufficiently to render it objectionably flexible for the reason that the teeth on either side or face of the file constitute strengthening or stiffening ribs for the file with respect to that side which is in operation, the teeth being arranged in opposite directions with respect to the file body.

Having thus described my invention, I claim as new and desire to secure by Letters Patent:—

In a file of the class set forth, a body having a series of parallel teeth arranged along one surface thereof at an angle of approximately 30 degrees to the longitudinal axis of the body, each tooth having a smooth sharp milled cutting edge unbroken from one edge of the file to the other and having its cutting face consisting of a plane substantially perpendicular to said body surface, the rear face of each tooth constituting a plane meeting said cutting face in an angle of substantially 30 degrees.

In testimony whereof I have signed my name to this specification in the presence of two subscribing witnesses.

OLIVER GEORGE SIMMONS.

Witnesses:
SAML. H. JOHNSON,
CHARLES P. ULMER.

---

Copies of this patent may be obtained for five cents each, by addressing the "Commissioner of Patents, Washington, D. C."